(12) United States Patent  
Kudou et al.

(10) Patent No.: US 7,593,075 B2  
(45) Date of Patent: Sep. 22, 2009

(54) REFLECTOR IN LIQUID CRYSTAL DISPLAY DEVICE AND METHOD OF FABRICATING THE SAME

(75) Inventors: Yasuki Kudou, Kanagawa (JP); Michiaki Sakamoto, Kanagawa (JP); Kenichirou Naka, Kanagawa (JP)

(73) Assignee: NEC LCD Technologies, Ltd, Kanagawa (JP)

( * ) Notice: Subject to any disclaimer, the term of this patent is extended or adjusted under 35 U.S.C. 154(b) by 412 days.

(21) Appl. No.: 11/352,317

(22) Filed: Feb. 13, 2006

(65) Prior Publication Data

US 2006/0181661 A1   Aug. 17, 2006

(30) Foreign Application Priority Data

Feb. 14, 2005 (JP) ............................. 2005-035952

(51) Int. Cl.
*G02F 1/1335* (2006.01)
(52) U.S. Cl. ..................... 349/114; 349/113; 349/115
(58) Field of Classification Search ......... 349/113–115, 349/187–192
See application file for complete search history.

(56) References Cited

U.S. PATENT DOCUMENTS

| | | | | |
|---|---|---|---|---|
| 6,342,935 B1* | 1/2002 | Jang et al. | ................... | 349/113 |
| 6,842,206 B2* | 1/2005 | Takizawa et al. | ........... | 349/106 |
| 6,985,196 B2* | 1/2006 | Otake et al. | ................. | 349/113 |
| 2003/0086036 A1* | 5/2003 | Yang et al. | ................... | 349/113 |
| 2004/0125287 A1* | 7/2004 | Jang et al. | ................... | 349/113 |

FOREIGN PATENT DOCUMENTS

| | | | |
|---|---|---|---|
| JP | 58-125084 A | | 7/1983 |
| JP | 4-243226 A | | 8/1992 |
| JP | 6-27481 A | | 2/1994 |
| JP | 10-123508 A | | 5/1998 |
| JP | 11-337964 A | | 12/1999 |
| JP | 2001004984 A | * | 1/2001 |
| JP | 2001-201743 A | | 7/2001 |
| JP | 2002-14211 A | | 1/2002 |
| JP | 2002-243923 A | | 8/2002 |
| JP | 2002-258272 A | | 9/2002 |
| JP | 2002-357844 A | | 12/2002 |
| JP | 2003-114429 A | | 4/2003 |
| JP | 2004-61767 A | | 2/2004 |

* cited by examiner

*Primary Examiner*—Julie Ngo
(74) *Attorney, Agent, or Firm*—Sughrue Mion, PLLC

(57) ABSTRACT

A reflector to be used in a liquid crystal display for reflecting an external light to display images therewith, including an organic film, and a reflective film formed covering the organic film therewith. The organic film has first raised and recessed portions at a surface thereof, and second raised and recessed portions formed at a surface of the first raised and recessed portions. The first raised and recessed portions include raised portions and recessed portions at least one of which is arcuate in cross-section, and the second raised and recessed portions are smaller in size than the first raised and recessed portions. The reflective film is shaped reflecting the first and second raised and recessed portions.

20 Claims, 17 Drawing Sheets

$$\Theta_1 = \Theta_2 \begin{pmatrix} \text{PERIODICITY OF INCLINATION} \\ \text{ANGLE OF WAVY PATTERN} \end{pmatrix}$$

REFLECTOR IN LIQUID CRYSTAL DISPLAY DEVICE AND METHOD OF FABRICATING THE SAME

BACKGROUND OF THE INVENTION

1. Field of the Invention

The invention relates to a reflector used in a liquid crystal display device, a method of fabricating the same, and a liquid crystal display device including the same.

2. Description of the Related Art

A liquid crystal display device is grouped into a light-transmission type liquid crystal display device, a light-reflection type liquid crystal display device, and a half-transmission type liquid crystal display device in accordance with a light-source thereof.

A light-transmission type liquid crystal display device is designed to have a light-source at the rear of the device, and display images by allowing a light (called "backlight") emitted from the light-source to pass therethrough or disallowing a light to pass therethrough.

A light-reflection type liquid crystal display device is designed to have a light-reflector at which an external light is reflected, and display images by allowing the reflected light to pass therethrough or disallowing the reflected light to pass therethrough.

A half-transmission type liquid crystal display device is designed to have a region in which the device acts as a light-transmission type liquid crystal display device, and a region in which the device acts as a light-reflection type liquid crystal display device.

Among the above-mentioned three liquid crystal display devices, a half-transmission type liquid crystal display device is often used as a display unit in a mobile device such as a mobile phone and in various electronic devices such as a digital camera both of which are expected to be used outdoors. This is because a light-transmission type liquid crystal display device used in a display unit of a note-type personal computer is accompanied with a problem that a user has difficulty in seeing images displayed in a display unit due to light reflection occurring at a surface of a display screen outdoors where sunlight is fierce.

In contrast, since a half-transmission type liquid crystal display device has a backlight source indoors, and uses an external light such as sunlight as a light source outdoors, a user can readily see displayed images indoors and outdoors. Thus, a half-transmission type liquid crystal display device is optimal as a display unit of a mobile device and a camera.

A light-reflection type liquid crystal display device is often used in a mobile game-player, for instance, since it does not need to have a light-source, and hence, has an advantage of low power consumption.

As suggested in Japanese Patent Application Publications Nos. 58-125084 and 4-243226, a reflector used in a half-transmission type or a light-reflection type liquid crystal display device is usually designed to include an organic film having a wavy surface. This is because that such a reflector has high affinity with a process (in particular, photolithography process in which a photoresist is used) of fabricating a TFT type liquid crystal display device, such a reflector can be fabricated at low costs, and such a reflector has high light-reflection characteristics superior to reflectors fabricated in accordance with other processes.

When an intensive light such as sunlight enters a liquid crystal display device including a reflector having a wavy surface, there occurs phenomenon in which, due to light interference, a surface of the liquid crystal display device is shiny, as if it emits a rainbow-color light. In a mobile device often used outdoors, such phenomenon is a critical defeat. Accordingly, there has been suggested a lot of solutions to such phenomenon.

Light interference is caused by periodicity of wavy pattern as illustrated in FIG. 1, and periodicity of an inclination angle of wavy pattern as illustrated in FIG. 2. Since light interference is dependent on a wavelength of a light, the above-mentioned phenomenon occurs.

The periodicity of wavy pattern can be reduced, for instance, by forming the wavy pattern in random. However, if the wavy pattern is formed in random, light-reflection rates in pixels would not be uniform, resulting in non-uniformity in brightness in displayed images.

Presently, a common wavy pattern is usually repeatedly formed in each of pixels, causing periodicity of wavy pattern. A common wavy pattern is formed in each of pixels for the purpose of reducing data volume of a photomask used in a photolithography process. Accordingly, if a wavy pattern is formed in random in order to avoid light interference, the data volume would be vast, resulting in much difficulty in fabrication of a photomask.

As to the periodicity of an inclination angle of wavy pattern, as long as smooth wavy pattern is formed by thermally annealing an organic film, the inclination angle is dependent on fluidity and surface tension of the organic film at a temperature dependent on a material of which the organic film is composed. Hence, it is difficult to remarkably change a profile of the inclination angle.

For instance, Japanese Patent Application Publications Nos. 2002-243923, 2002-14211, 2001-201743, 10-123508 and 11-337964 have suggested using non-periodical wavy pattern in order to reduce the above-mentioned periodicity of wavy pattern.

Japanese Patent Application Publication No. 6-27481 has suggested differentiating heights of raised and recessed portions in wavy pattern in order to reduce the periodicity of an inclination angle of wavy pattern.

Japanese Patent Application Publication No. 2002-258272 has suggested a method controlling a profile of an inclination angle of wavy pattern and a distance between a raised portion and a recessed portion in wavy patter in order to reduce the periodicity of an inclination angle of wavy pattern.

For instance, Japanese Patent Application Publication No. 2004-61767 has suggested a method of fabricating small wavy pattern by coating small light-reflective particles onto a film. Japanese Patent Application Publications Nos. 2003-114429 and 2002-357844 have suggested a method of forming small wavy pattern at a surface of a light-reflective film by controlling a temperature at which the light-reflective film is formed.

However, since the above-mentioned conventional methods of reducing light interference in a reflector include a step of forming wavy pattern at a surface of an organic film, it was not possible to delete the periodicity of an inclination angle of wavy pattern, and avoid a display screen from being colored due to light interference.

Thus, in order reduce light interference, light-diffusion adhesive is coated onto a light deflector in a half-transmission or light-reflection type liquid crystal display device to thereby avoid a display screen from being colored due to light interference. However, the light-diffusion adhesive causes reduction in a light reflection rate and reflection contrast due to light diffusion caused by the light-diffusive adhesive. In particular, in a half-transmission type liquid crystal display device, since it is not possible to coat light-diffusive adhesion only onto an area in which the liquid crystal display device acts as a light-reflection type liquid crystal display device, there is caused a problem that the light-transmission contrast is lowered to about a half.

The conventional method of forming small wavy pattern by coating small light-reflective particles onto a film, suggested in Japanese Patent Application Publication No. 2004-61767, is accompanied with the following problem.

In a half-transmission type liquid crystal display device, it is necessary to coat light-reflective particles only onto an area in which the liquid crystal display device acts as a light-reflection type liquid crystal display device, and hence, it would be necessary to pattern the light-reflective particles. However, unlike an ordinary metal film, it is quite difficult to pattern the light-reflective particles. In addition, particles often cause contaminants in a fabrication process, resulting in reduction in a fabrication yield.

The conventional method of forming small wavy pattern at a surface of a light-reflective film by controlling a temperature at which the light-reflective film is formed, suggested in Japanese Patent Application Publications Nos. 2003-114429 and 2002-357844, is accompanied with the following problem.

In these methods, small wavy pattern is formed at a surface of a light-reflective film by grain growth of the light-reflective film by controlling a temperature at which the light-reflective film (for instance, an aluminum film) is formed. A temperature at which a light-reflective film is heated for formation thereof is restricted by a maximum temperature (about 250 degrees centigrade) against which an underlying organic film has resistance. Accordingly, it is not always possible to select a desired temperature for heating the light-reflective film.

If a temperature at which a light-reflective film is formed is higher, blue lights having a short wavelength (0.4 micrometers or smaller) would be scattered by wavy pattern formed by grain growth, resulting in that the light-reflective film would be yellowed. Thus, the above-mentioned conventional methods cannot provide conditions necessary for formation of the small wavy pattern.

In addition, since common conditions are applied to a substrate in the above-mentioned conventional methods, it would not be possible to form small wavy pattern only in a part of a light-reflector.

SUMMARY OF THE INVENTION

In view of the above-mentioned problems in the prior art, it is an object of the present invention to provide a reflector to be used in a liquid crystal display device, which is capable of preventing light interference caused by periodicity of wavy pattern to thereby avoid a reflector from being colored.

It is also an object of the present invention to provide a method of fabricating the above-mentioned reflector.

It is further an object of the present invention to provide a liquid crystal display device including the above-mentioned reflector.

In one aspect of the present invention, there is provided a reflector to be used in a liquid crystal display device including: a first substrate, a second substrate disposed in facing relation to the first substrate, and a liquid crystal layer sandwiched between the first and second substrates, wherein an external light is reflected at a reflector formed on one of the first and second substrates to display images therewith, the reflector including an organic film, and a reflective film formed covering the organic film therewith, wherein the organic film has first raised and recessed portions at a surface thereof, and second raised and recessed portions formed at a surface of the first raised and recessed portions, the first raised and recessed portions including raised portions and recessed portions at least one of which is arcuate in cross-section, the second raised and recessed portions being smaller in size than the first raised and recessed portions, the reflective film being shaped reflecting the first and second raised and recessed portions.

The reflector in accordance with the present invention is applicable to a light-reflection or half-transmission type liquid crystal display device.

For instance, the first raised and recessed portions may be wavy in shape.

It is preferable that the organic film and the reflective film are disposed overlapping a thin film transistor of the liquid crystal display device.

It is preferable that a pitch between adjacent raised or recessed portions in the second raised and recessed portions is equal to or smaller than 0.4 micrometers.

It is preferable that the second raised and recessed portions are irregular in shape.

It is preferable that the second raised and recessed portions are formed only at a part of a surface of the organic film.

For instance, the reflective film is composed of aluminum or aluminum alloy.

It is preferable that the reflective film has a multi-layered structure of an aluminum or aluminum alloy layer and at least one layer composed of a metal other than aluminum.

It is preferable that the reflective film has a thickness equal to or smaller than 0.4 micrometers.

It is preferable that the organic film is comprised of a photo-sensitive organic film.

There is further provided a liquid crystal display device including the above-mentioned reflector.

The liquid crystal display device in accordance with the present invention may be mounted on an electronic device such as a mobile communication terminal and a mobile phone.

In another aspect of the present invention, there is provided a method of fabricating a reflector be used in a liquid crystal display device including: a first substrate, a second substrate disposed in facing relation to the first substrate, and a liquid crystal layer sandwiched between the first and second substrates, wherein an external light is reflected at a reflector formed on one of the first and second substrates to display images therewith, the method including forming a photosensitive organic film on a substrate, patterning the photosensitive organic film, thermally annealing the photosensitive organic film to form first raised and recessed portions at a surface thereof, the first raised and recessed portions including raised portions and recessed portions at least one of which is arcuate in cross-section, forming second raised and recessed portions at a surface of the first raised and recessed portions, the second raised and recessed portions being smaller in size than the first raised and recessed portions, and forming a reflective film on the photosensitive organic film.

It is preferable that the second raised and recessed portions are formed by dry etching.

It is preferable that the dry etching is comprised of ion bombardment.

It is preferable that inert gas is used in the dry etching.

It is preferable that one of mixture gas including inert gas and oxygen gas, and mixture gas including inert gas and gas containing oxygen atoms is used in the dry etching.

The advantages obtained by the aforementioned present invention will be described hereinbelow.

In the present invention, the first raised and recesses portions are formed at a surface of the organic film, and the second raised and recesses portions smaller in size than the first raised and recesses portions are formed at a surface of the first raised and recesses portions. The reflective film formed on the organic film reflects the first and second raised and recesses portions in shape.

The first and second raised and recesses portions are different from each other with respect to a pitch between adjacent raised (or recessed) portions and a profile of an inclination angle of the raised and recessed portions. Thus, it is possible to delete the periodicity of wavy pattern. Accordingly, it is possible to avoid light interference caused by the periodicity of wavy pattern, and prevent a reflector from being colored.

Since the reflector is prevented from being colored due to light interference, it is no longer necessary to use light-diffusion adhesive in a light reflector. As a result, it is possible to reduce fabrication costs, and further, enhance a light-reflection rate and contrast. In particular, it is possible to enhance light-transmission contrast in a half-transmission type liquid crystal display device.

For instance, the first raised and recesses portions may be formed by exposing a photosensitive organic film to light, developing the film, and thermally heating the film. The second raised and recesses portions may be formed by roughing a surface of the first raised and recesses portions. For instance, the second raised and recesses portions may be formed by applying dry etching (for instance, reactive ion-etching (RIE) using inert gas) to a surface of the organic film at which the first raised and recesses portions are formed. By coating the reflective film onto a surface of the organic film at which the first and second raised and recesses portions have been formed, the reflective film would reflect a surface of the organic film in shape.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained hereinbelow with reference to drawings.

First Embodiment

Figure 1:
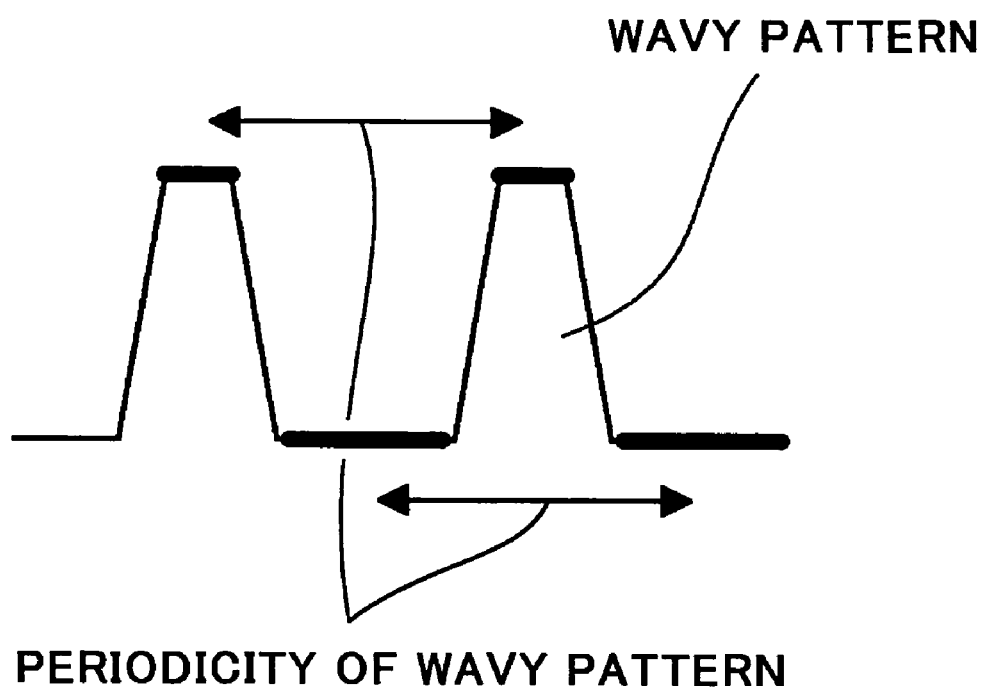
FIG. 1 illustrates the periodicity of wavy pattern which causes light interference.
Figure 2:
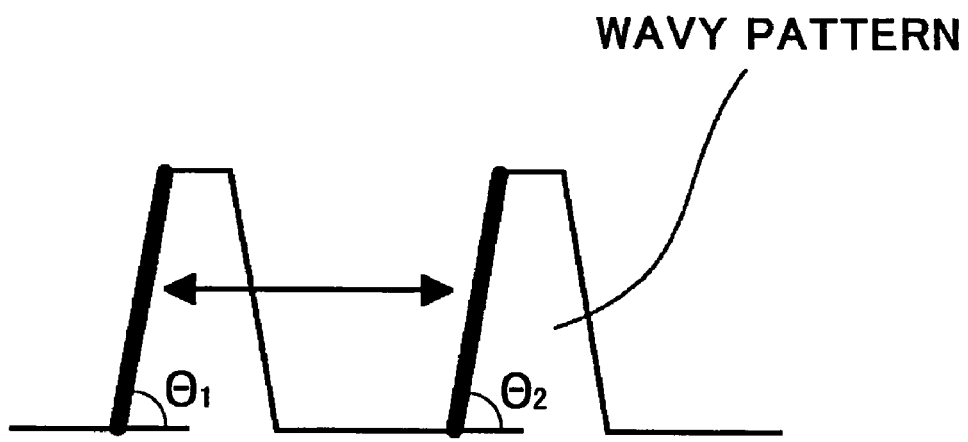
FIG. 2 illustrates the periodicity of an inclination angle of wavy pattern which causes light interference.
Figure 3:
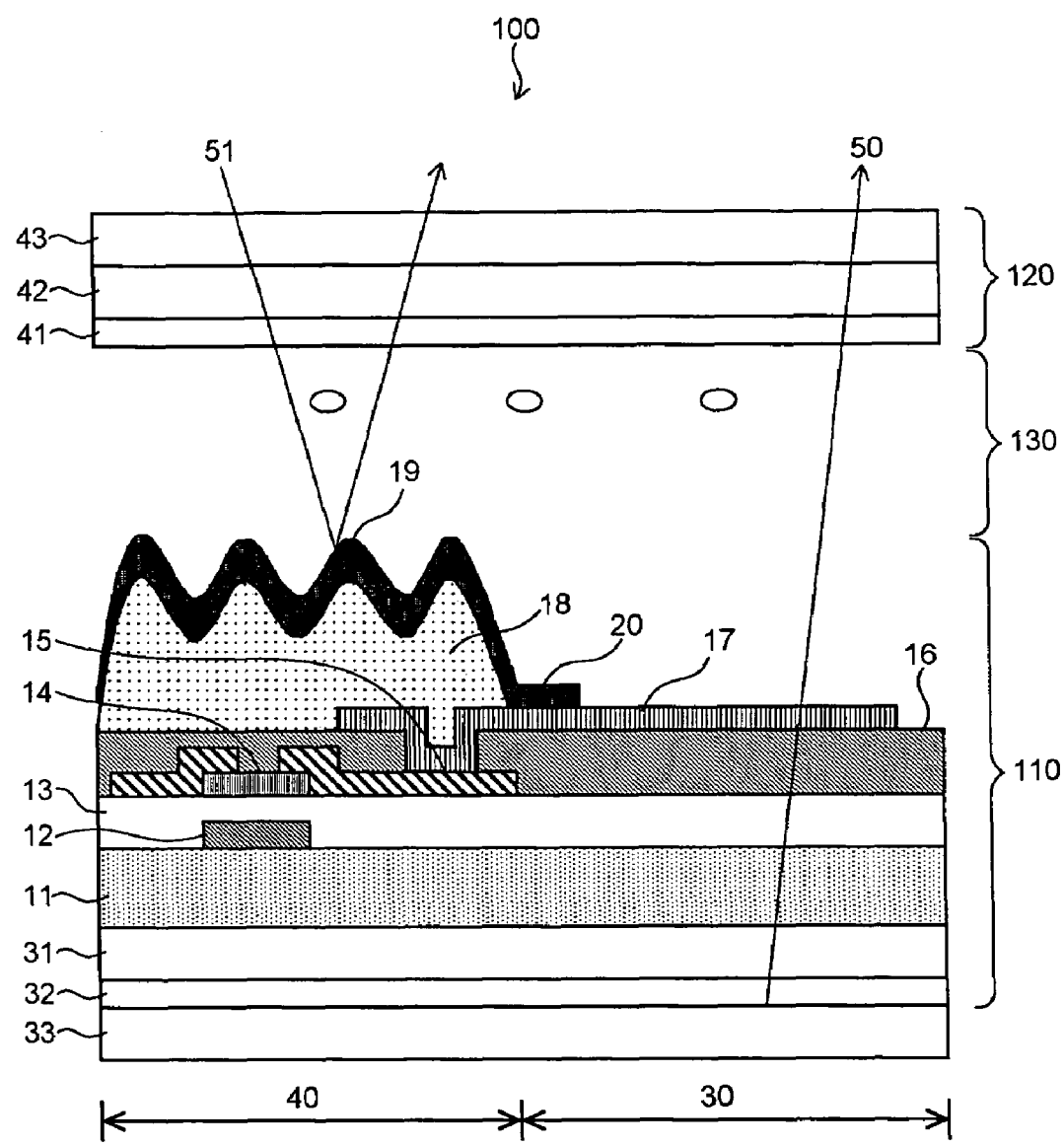
FIG. 3 is a cross-sectional view of a liquid crystal display device including a reflector in accordance with the first embodiment of the present invention.
Figure 9:
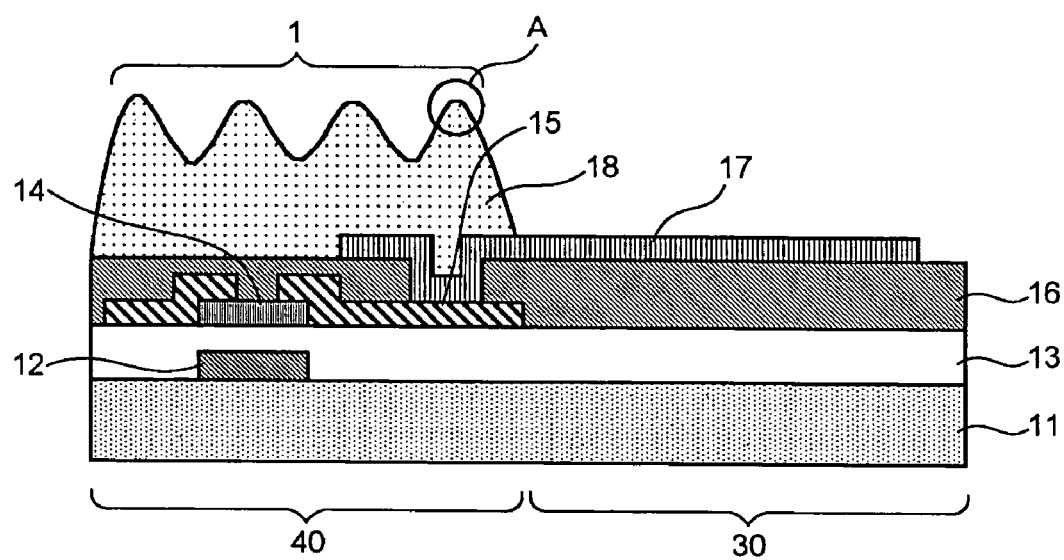
FIG. 9 illustrates a step of a method of fabricating the reflector in accordance with the first embodiment of the present invention.
Figure 10:
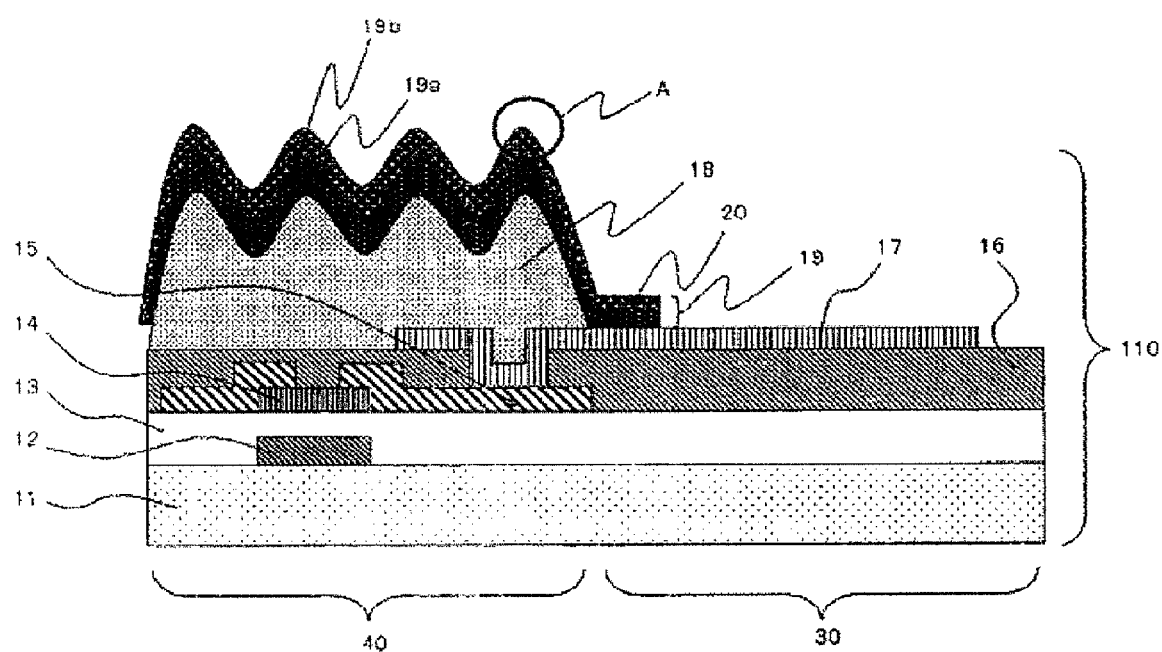
FIG. 10 illustrates a step of a method of fabricating the reflector in accordance with the first embodiment of the present invention.
Figure 11:
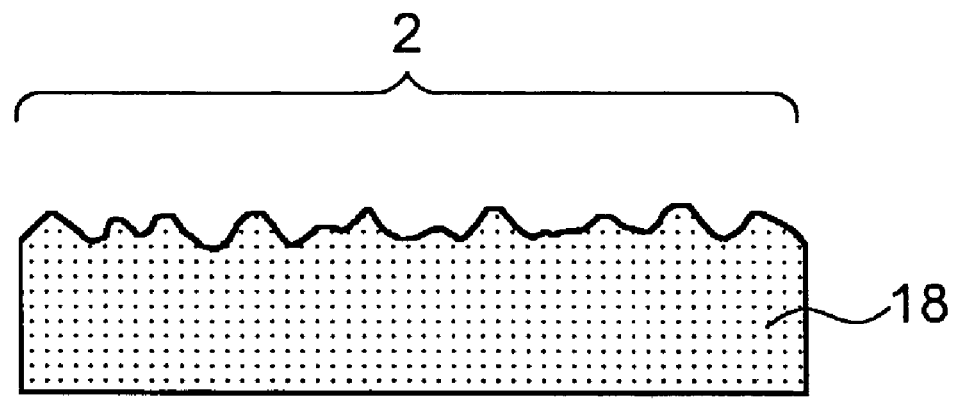
FIG. 11 is an enlarged cross-sectional view of the section A indicated in FIG. 9.
Figure 12:
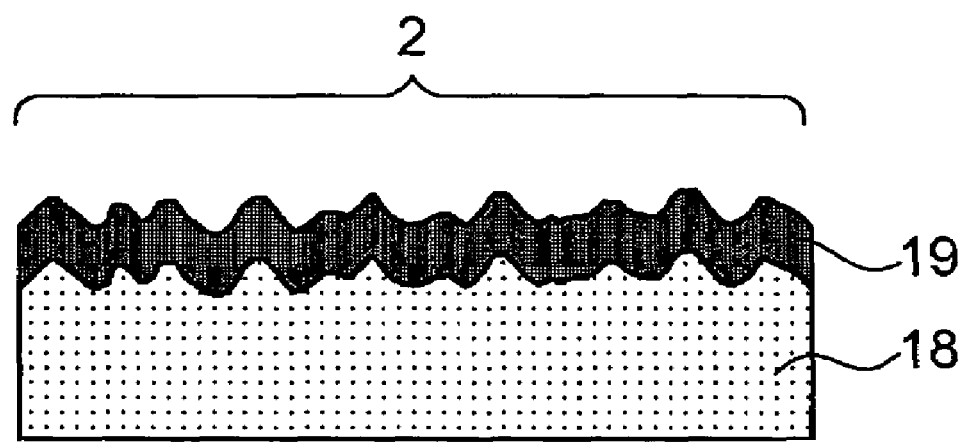
FIG. 12 is an enlarged cross-sectional view of the section A indicated in FIG. 10.

FIG. 3 is a cross-sectional view of a liquid crystal display device 100 including a reflector in accordance with the first embodiment of the present invention. Each of FIGS. 4 to 10 illustrates a step of a method of fabricating an active matrix substrate including the reflector in accordance with the first embodiment of the present invention. FIG. 11 is an enlarged cross-sectional view of the section A indicated in FIG. 9, and FIG. 12 is an enlarged cross-sectional view of the section A indicated in FIG. 10.

The liquid crystal display device 100 in accordance with the first embodiment is a half-transmission type liquid crystal display device including a light-transmission area 30 in which the liquid crystal display device 100 acts as a light-transmission type liquid crystal display device, and a light-reflection area 40 in which the liquid crystal display device 100 acts as a light-reflection type liquid crystal display device.

The liquid crystal display device 100 is comprised of an active matrix substrate 110, an opposing substrate 120 disposed in facing relation to the active matrix substrate 110, and a liquid crystal layer 130 sandwiched between the active matrix substrate 110 and the opposing substrate 120.

The active matrix substrate 110 is comprised of a first transparent substrate 11 composed of glass, a retardation plate 31 formed on the first transparent substrate 11 at the opposite side of the liquid crystal layer 130, a polarizer 32 formed on the retardation plate 31, a gate electrode 12 formed on the first transparent substrate 11 at the same side of the liquid crystal layer 130, a gate insulating film 13 formed on the first transparent substrate 11 covering the gate electrode 12 therewith, a semiconductor film 14 formed on the gate insulating film 13 above the gate electrode 12, source/drain electrodes 15 formed on the gate insulating film 13 around the semiconductor film 14, a passivation film 16 formed on the gate insulating film 13 covering the semiconductor film 14 and the source/drain electrodes 15 therewith, a light-transmission electrode 17 formed on the passivation film 16 and composed of ITO (indium tin oxide), an organic film 18 formed on the passivation film 16 partially covering the light-transmission electrode 17 therewith, and a light-reflective film 19 covering the organic film 18 therewith.

A backlight source 33 is disposed below the polarizer 32.

As mentioned in detail later, a reflector in accordance with the first embodiment is comprised of the organic film 18, and the light-reflective film 19 covering the organic film 18 therewith.

The opposing substrate 120 is comprised of a second transparent substrate 41 composed of glass, a retardation plate 42 formed on the second transparent substrate 41, and a polarizer 43 formed on the retardation plate 42.

In the light-transmission area 30, a light 50 emitted from the backlight source 33 passes through the liquid crystal display device 100. Hence, the light-transmission electrode 17 through which the light 50 passes therethrough is formed in the light-transmission area 30.

In the light-reflection area 40, an external light 51 is reflected. Hence, the reflector comprised of the organic film 18 and the light-reflective film 19 is formed in the light-reflection area 40.

On the first transparent substrate 11 of the active matrix substrate 110 are formed a plurality of scanning lines (not illustrated) extending in parallel with one another, a plurality of signal lines (not illustrated) extending in parallel with one another and perpendicularly to the scanning lines, thin film transistors (TFTs) disposed at intersections of the scanning and signal lines, and a pixel electrode.

Each of the thin film transistors is comprised of the gate electrode 12, the gate insulating film 13, the semiconductor film 14, and the source/drain electrodes 15.

The pixel electrode is comprised of the light-reflective film 19 and the light-transmission electrode 17 electrically connected to each other, and is electrically connected to the thin film transistor.

The light-transmission electrode 17 and the light-reflective film 19 are separated from each other by the organic film 18 covering the TFT therewith.

As illustrated in FIG. 9, first raised and recessed portions 1 are formed at a surface of the organic film 18. The first raised and recessed portions 1 are gently wavy. As illustrated in FIG. 11, second raised and recessed portions 2 are formed at a surface of the first raised and recessed portions 1. The second raised and recessed portions 2 are smaller in size or more steeply wavy than the first raised and recessed portions 1.

The light-reflective film 19 is formed covering the organic film 18 therewith. As illustrated in FIGS. 10 and 12, the light-reflective film 19 has a shape reflecting a surface of the organic film 18. That is, raised and recessed portions similar to the first and second raised and recessed portions 1 and 2 formed at a surface of the organic film 18 are formed also at a surface of the light-reflective film 19.

Hereinbelow is explained a method of fabricating the active matrix substrate 110, with reference to FIGS. 4 to 10.

Figure 4:
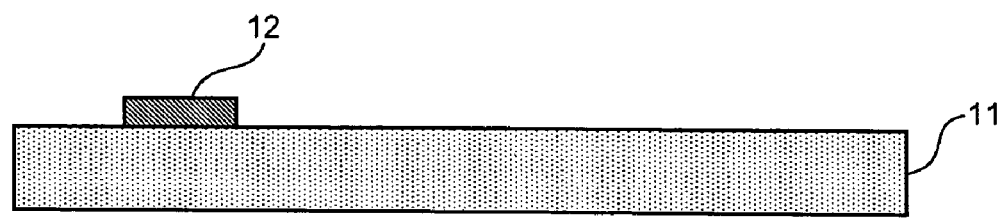
FIG. 4 illustrates a step of a method of fabricating the reflector in accordance with the first embodiment of the present invention.

First, as illustrated in FIG. 4, the gate electrode 12 and the scanning lines (they do not appear in FIG. 4, because they extend perpendicularly to a plane of FIG. 4 from the gate electrode 12) are formed on the first transparent substrate 11.

Figure 5:
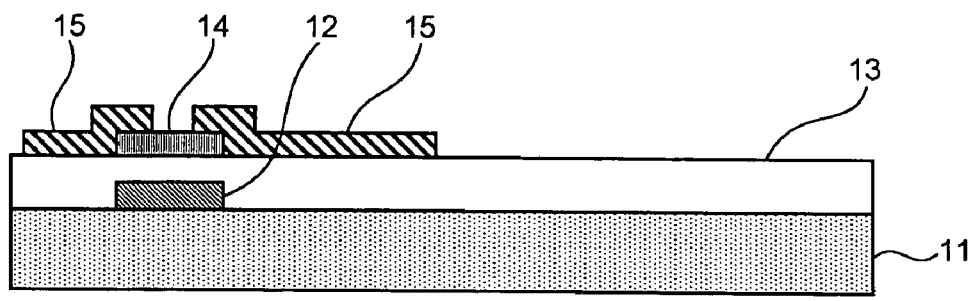
FIG. 5 illustrates a step of a method of fabricating the reflector in accordance with the first embodiment of the present invention.

Then, as illustrated in FIG. 5, the gate insulating film 13 is formed on the first transparent substrate 11 covering the gate electrode 12 and the scanning lines therewith. For instance, the gate insulating film 13 is comprised of a silicon nitride film.

Then, an amorphous silicon film and a phosphorus-doped amorphous silicon film defining an ohmic contact layer are formed on the gate insulating film 13. Then, those films are patterned into an island by photolithography and etching. Thus, as illustrated in FIG. 5, the semiconductor film 14 is formed on the gate insulating film 13.

Then, the source/drain electrodes 15 and the signal lines (not illustrated) are formed on the gate insulating film 13.

Figure 6:
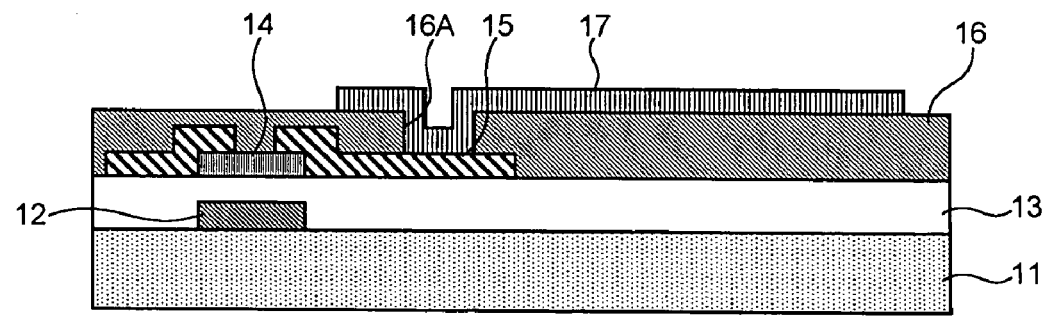
FIG. 6 illustrates a step of a method of fabricating the reflector in accordance with the first embodiment of the present invention.

Thereafter, a portion of the phosphorus-doped amorphous silicon film remaining between the source and drain electrodes 15 is removed. Then, as illustrated in FIG. 6, the passivation film 16 comprised of a silicon nitride film is formed entirely over the resultant.

Then, a through-hole 16A through which the source electrode 15 and light-transmission electrode 17 are electrically connected to each other is formed throughout the silicon nitride film. Then, as illustrated in FIG. 6, the light-transmission electrode 17 comprised of an indium tin oxide (ITO) film is formed covering an inner surface of the through-hole 16A therewith.

Figure 7:
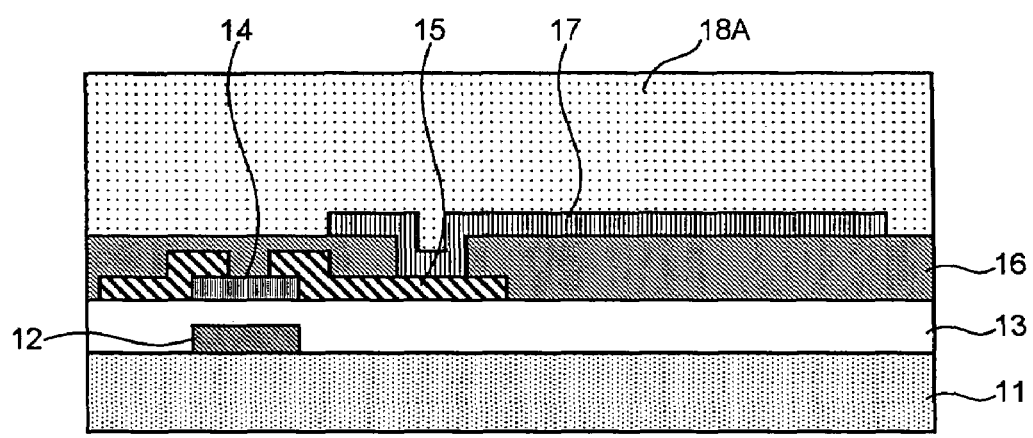
FIG. 7 illustrates a step of a method of fabricating the reflector in accordance with the first embodiment of the present invention.

Then, as illustrated in FIG. 7, photosensitive acrylic resin 18A is coated entirely over the passivation film 16 and the light-transmission electrode 17.

Figure 8:
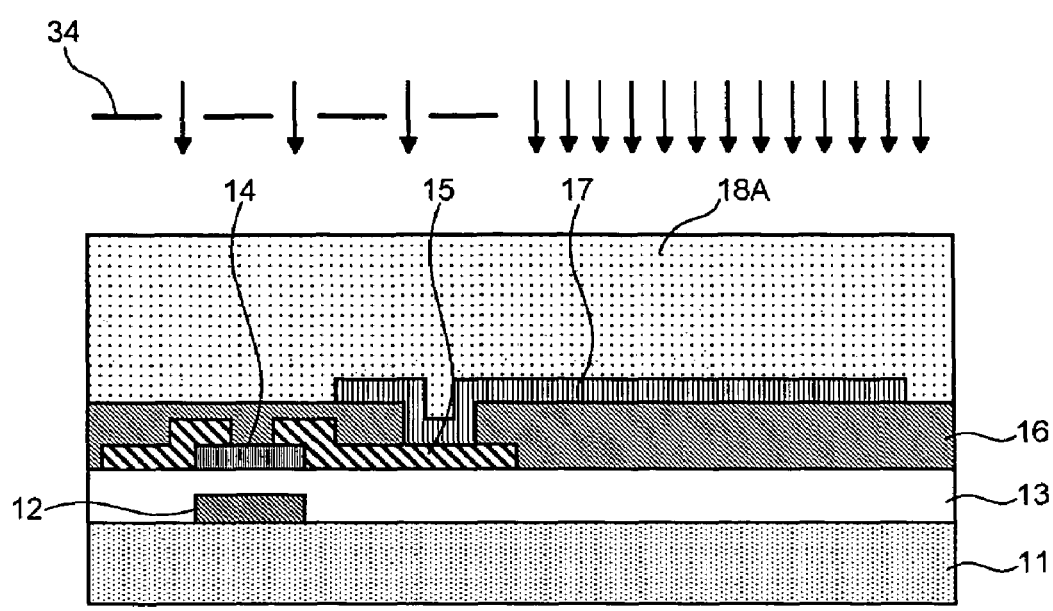
FIG. 8 illustrates a step of a method of fabricating the reflector in accordance with the first embodiment of the present invention.

Then, as illustrated in FIG. 8, the photosensitive acrylic resin 18A is exposed to a light through a photomask 34. Thus, the light-reflection area 40 and the light-transmission area 30 are exposed to a light at an optimal amount, and then, developed. Then, the photosensitive acrylic resin 18A is thermally annealed.

As a result, as illustrated in FIG. 9, the photosensitive acrylic resin 18A is patterned into the organic film 18, and the organic film 18 disposed in the light-reflection area 40 has a gently wavy first wavy pattern 1 or has the first raised or recessed portions 1 at a surface thereof.

As illustrated in FIG. 9, the photosensitive acrylic resin 18A formed in the light-transmission area 30 are all exposed to a light, resulting in being entirely removed.

Then, dry etching using inert gas such as argon or helium gas is applied to a surface of the organic film 18 to thereby form the second raised or recessed portions 2 or a second wavy pattern 2 (see FIG. 11) at a surface of the first wavy pattern 1. The second wavy pattern 2 is smaller in size than or more sharply than the first wavy pattern 1 with respect to raised and recessed portions.

For instance, the second wavy pattern 2 may be formed by dry etching in which ion bombardment of inert gas is mainly carried out.

A conventional reactive ion etching (RIE) apparatus may be used to carry out such dry etching. For instance, introducing inert gas into a chamber of the apparatus, dry etching may be carried out at a relatively small pressure, for instance, at 10 Pa or smaller.

The second wavy pattern 2 can be formed only by physical etching providing high ion bombardment. It is not possible to form the second wavy pattern 2 by plasma etching providing small ion bombardment.

As an atmospheric gas to be used when the etching is carried out, an inert gas is suitable. Other gases may be used, if they do not chemically etch the organic film 18. Reducing gas is not suitable to etching, because it reduces the underlying ITO film 17.

Oxygen gas or gas containing oxygen therein chemically etches the organic film 18. However, if oxygen gas or gas containing oxygen therein is slightly added to inert gas, it would be possible to increase an etching rate and enhance a throughput.

It is possible to control the second wavy pattern 2 in shape by optimally selecting gases, a mixture ratio of gases, a pressure at which etching is carried out, and power applied for carrying out etching.

If the underlying ITO film 17 or the passivation film 16 were damaged when the organic film 18 is dry-etched, an area other than an area in which the second wavy pattern 2 is to be formed is covered with a photoresist, and then, the dry etching is carried out. Thereafter, the photoresist is removed.

It is preferable that a pitch between adjacent raised (or recessed) portions in the second wavy pattern 2 is smaller than the same in the first wavy pattern 1.

If a pitch between adjacent raised (or recessed) portions in the second wavy pattern 2 is greater than 0.4 micrometers, blue lights having a wavelength almost equal to the pitch are scattered at the second wavy pattern 2, resulting in that the organic film 8 looks as if it is yellow-colored. Hence, the pitch in the second wavy pattern 2 is preferably equal to or smaller than 0.4 micrometers. Thus, a pitch between adjacent raised (or recessed) portions in the second wavy pattern 2 is designed to be equal to or smaller than 0.4 micrometers.

It is preferable that pitches between adjacent raised (or recessed) portions and depth of raised or recessed portions in the second wavy pattern 2 are irregular or non-uniform. Such irregular or non-uniform pitches or depth prevent light interference.

Since the raised and recessed portions in the first wavy pattern 1 are formed by applying photolithography to the photosensitive organic resin 18A, a lower limit of a dimension of the first wavy pattern 1 is dependent on accuracy in light exposure.

A light-exposure apparatus used for a big size glass in a process for fabricating a liquid crystal display device has about 3 micrometers as minimum processing dimension. For instance, when a circular raised portion having a diameter of 3 micrometers, a minimum pitch between adjacent raised (or recessed) portions in the first wavy pattern 1 is 6 micrometers or greater. An upper limit of the pitch is dependent on a size of a pixel in which the raised and recessed portions are disposed. A size of a pixel is dependent on a size of a screen and/or resolution. In a diagonal-2.2 type (5.6 cm) QVGA (240×320 pixels) generally used for a mobile phone, a pixel has a size of about 50 micrometer square, and the light-reflection area 40 has an area equal to about ½ to ⅓ of the size of a pixel. Since it is necessary to dispose the reflector in the light-reflection area 40 and the light-reflection area 40 has to include one or more pitch of the raised and recessed portions, an upper limit of the pitch is about 30 micrometers.

Then, as illustrated in FIG. 10, a molybdenum film 19a and an aluminum film 19b are formed over the organic film 18 and the ITO film 17. The molybdenum film 19a and the aluminum film 19b will make the light-reflective film 19. The molybdenum film 19a acts as a barrier film to suppress cell reaction between the aluminum film 19b and the ITO film 17. The light-reflective film 19 may be comprised of an aluminum film and a metal film other than an aluminum film.

If the light-reflective film 19 is formed thick, the second wavy pattern 2 may be buried in the light-reflective film 19. Hence, it is preferable that the light-reflective film 19 has a thickness equal to or smaller than 0.4 micrometers.

Then, the molybdenum and aluminum films 19a and 19b are patterned by photolithography and etching into the light-reflective film 19.

As illustrated in FIG. 10, the light-reflective film 19 acting as a light-reflection electrode and the light-transmission electrode 17 are electrically connected to each other through an electrode connector 20 which is a part of the light-reflective film 19.

The light-reflective film 19 in the first embodiment is designed to have a multi-layered structure comprised of an aluminum film and a metal film other than an aluminum film. As an alternative, the light-reflective film 19 may be designed to have a multi-layered structure comprised of an aluminum alloy film and a metal film other than an aluminum alloy film. Furthermore, the light-reflective film 19 may be comprised simply of an aluminum film or an aluminum alloy film.

As illustrated in FIGS. 10 and 12, the light-reflective film 19 has a surface reflecting a shape of the underlying, gently wavy first wavy pattern 1 and the second wavy pattern 2 more steeply than the first wavy pattern 1.

The retardation plate 31 and the polarizer 32 are attached to the first transparent substrate 11 in any step such as a step to be carried out subsequently to the step of fabricating the resultant illustrated in FIG. 10, or a step to be carried out prior to the step of fabricating the resultant illustrated in FIG. 4.

Then, an alignment film is coated onto the active matrix substrate 110 and the opposing substrate 120.

Then, spacers are sandwiched between the substrates 110 and 120 to define a gap therebetween. Then, liquid crystal is introduced into the gap, and then, the gap is hermetically sealed. Thus, the liquid crystal display device 100 is completed.

It is necessary to define a difference between a gap in the light-reflection area 40 and a gap in the light-transmission area 30 such that the retardation in the light-transmission area 30 is equal to a ¼ wavelength, and the retardation in the light-reflection area 40 is equal to a ½ wavelength. The difference can be ensured by controlling an average height of the photosensitive acrylic resin 18A in the light-transmission area 30 relative to the ITO film 17.

In accordance with the above-mentioned first embodiment, the first wavy pattern 1 as a gently wavy pattern is formed at a surface of the organic film 18, and the second wavy pattern 1 more sharply than the first wavy pattern 1 with respect to the raised and recessed portions is formed at a surface of the first wavy pattern 1. The light-reflective film 19 formed on the organic film 18 reflects the first and second wavy patterns 1 and 2 in shape.

The first and second wavy patterns 1 and 2 are different from each other with respect to a pitch between adjacent raised (or recessed) portions and a profile of an inclination angle of the raised and recessed portions. Thus, it is possible to delete the periodicity of wavy pattern. Accordingly, it is possible to avoid light interference caused by the periodicity of wavy pattern, and prevent a reflector from being colored.

Since the reflector is prevented from being colored due to light interference, it is no longer necessary to use light-diffusion adhesive in a light reflector. As a result, it is possible to reduce fabrication costs, and further, enhance a light-reflection rate and contrast. In particular, it is possible to enhance light-transmission contrast in a half-transmission type liquid crystal display device.

For instance, the first wavy pattern 1 may be formed by exposing a photosensitive organic film to light, developing the film, and thermally heating the film. The second wavy pattern 2 may be formed by roughing a surface of the first wavy pattern 1. For instance, the second wavy pattern 2 may be formed by applying dry etching (for instance, reactive ion-etching (RIE) using inert gas) to a surface of the organic film 18 at which the first wavy pattern 1 is formed. By coating the light-reflective film 19 onto a surface of the organic film 18 at which the first and second wavy patterns 1 and 2 have been formed, the light-reflective film 19 would reflect a surface of the organic film 18 in shape.

A dimension of the raised and recessed portions of the second wavy pattern 2, such as a pitch and a depth, may be controlled by selecting etching gas and/or controlling a pressure or etching power.

Furthermore, it is possible to carry out etching only to an area in which the second wavy pattern 2 should be formed, by means of photolithography. Hence, it is possible to form the second wavy pattern 2 only at a part of a surface of the organic film 18.

Second Embodiment

Figure 13:
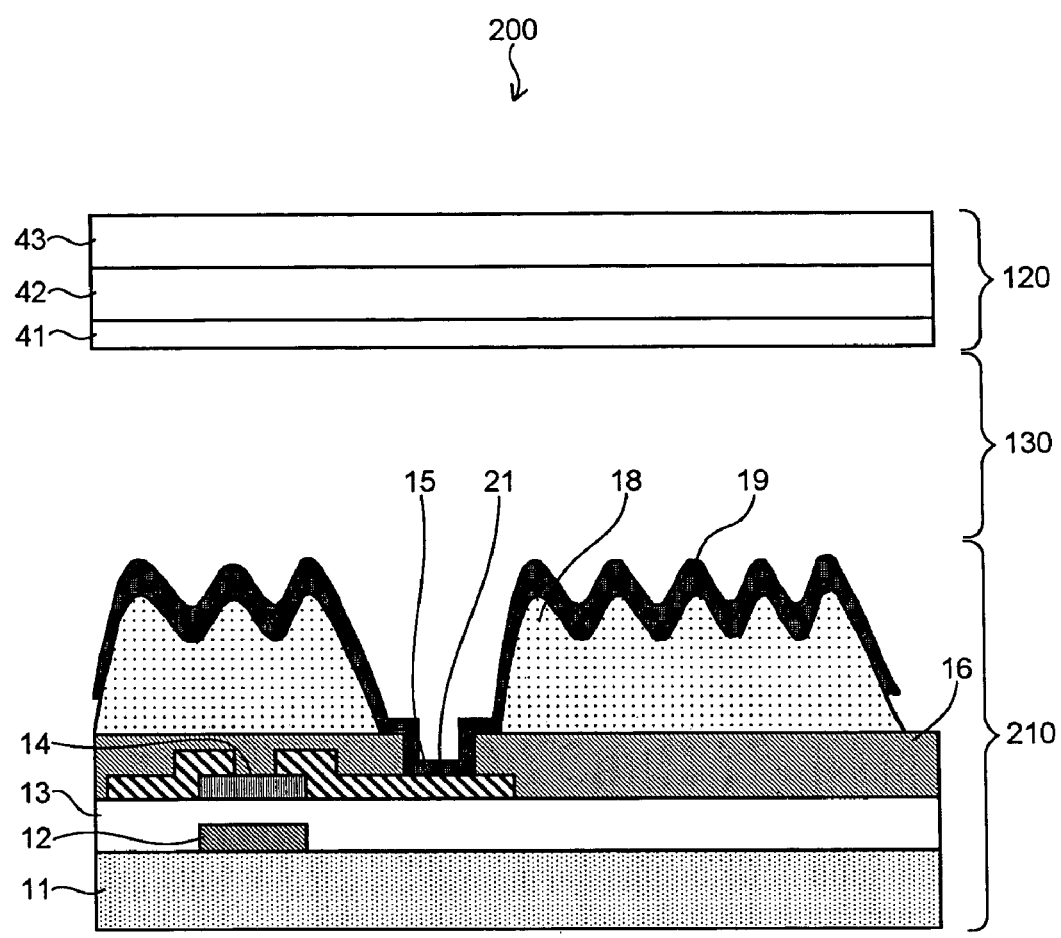
FIG. 13 is a cross-sectional view of a liquid crystal display device including a reflector in accordance with the second embodiment of the present invention.

FIG. 13 is a cross-sectional view of a liquid crystal display device 200 including a reflector in accordance with the second embodiment of the present invention.

The liquid crystal display device 200 is a light-reflection type liquid crystal display device including a light-reflector at which an external light is reflected, and display images by allowing the reflected light to pass therethrough or disallowing the reflected light to pass therethrough.

The liquid crystal display device 200 is comprised of an active matrix substrate 210, an opposing substrate 220 disposed in facing relation to the active matrix substrate 210, and a liquid crystal layer 130 sandwiched between the active matrix substrate 210 and the opposing substrate 220.

The active matrix substrate 210 is comprised of a first transparent substrate 11 composed of glass, a gate electrode 12 formed on the first transparent substrate 11 at the same side of the liquid crystal layer 130, a gate insulating film 13 formed on the first transparent substrate 11 covering the gate electrode 12 therewith, a semiconductor film 14 formed on the gate insulating film 13 above the gate electrode 12, source/drain electrodes 15 formed on the gate insulating film 13 around the semiconductor film 14, a passivation film 16 formed on the gate insulating film 13 covering the semiconductor film 14 and the source/drain electrodes 15 therewith, an organic film 18 formed on the passivation film 16, and a light-reflective film 19 covering the organic film 18 therewith.

As mentioned later in detail, a reflector in accordance with the second embodiment is defined by the organic film 18 and the light-reflective film 19 covering the organic film 18 therewith.

Similarly to the opposing substrate in the first embodiment, the opposing substrate 120 is comprised of a second transparent substrate 41 composed of glass, a retardation plate 42 formed on the second transparent substrate 41, and a polarizer 43 formed on the retardation plate 42.

Figure 14:
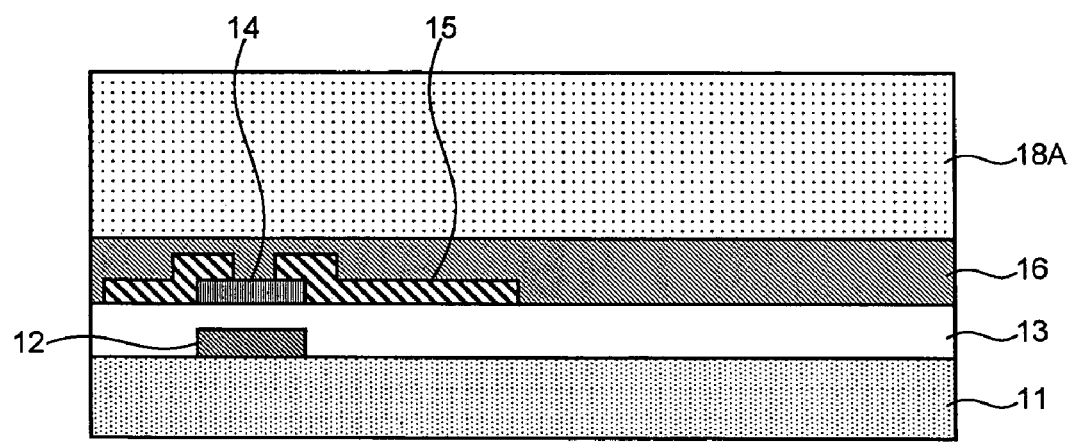
FIG. 14 illustrates a step of a method of fabricating the reflector in accordance with the second embodiment of the present invention.
Figure 15:
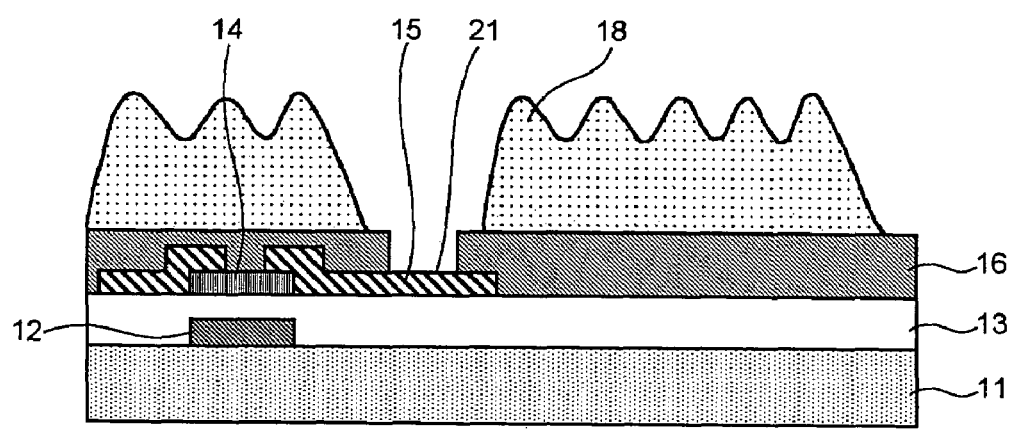
FIG. 15 illustrates a step of a method of fabricating the reflector in accordance with the second embodiment of the present invention.
Figure 16:
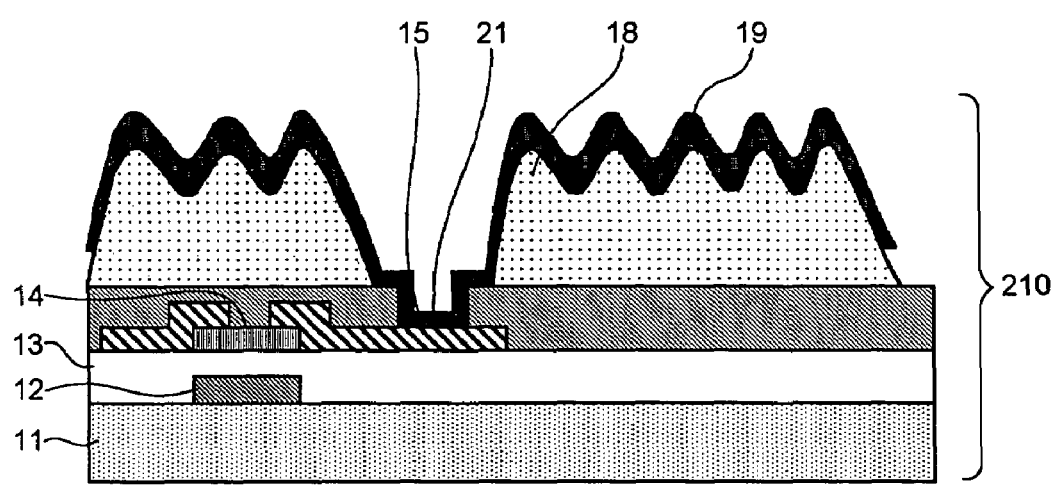
FIG. 16 illustrates a step of a method of fabricating the reflector in accordance with the second embodiment of the present invention.

Each of FIGS. 14 to 16 illustrates a step of a method of fabricating the active matrix substrate 210 including the reflector in accordance with the second embodiment. Hereinbelow is explained a method of fabricating the active matrix substrate 210, with reference to FIGS. 14 to 16.

The steps carried out before the passivation film 16 is formed on the gate insulating film 13 are identical with the steps in the first embodiment, that is, the steps illustrated in FIGS. 4 to 6.

In the second embodiment, after the passivation film 16 comprised of a silicon nitride film has been formed on the gate insulating film 13, photosensitive novolak resin 18A is coated onto the passivation film 16 without forming the through-hole 16A throughout the passivation film 16, as illustrated in FIG. 14.

Then, similarly to the first embodiment, the photosensitive novolak resin 18A is exposed to light to thereby form the first wavy pattern 1 at a surface of the organic film, as illustrated in FIG. 15. In the second embodiment, unlike the first embodiment, a through-hole 21 is simultaneously formed throughout the photosensitive novolak resin 18A.

Then, dry etching is carried out to a surface of the organic film 18 to form the second wavy pattern 2 at a surface of the organic film 18.

Then, the through-hole 21 is extended through the passivation film 16 to reach the source/drain electrodes 15.

Then, as illustrated in FIG. 16, the light-reflective film 19 is formed covering therewith a surface of the organic film 18 and an inner wall of the through-hole 21. The light-reflective film 19 is composed of silver, for instance. The light-reflective film 19 and the source electrode 15 are electrically connected to each other through the through-hole 21.

Then, similarly to the first embodiment, the active matrix substrate 210 and the opposing substrate 120 are attached to each other. Thus, there is completed the liquid crystal display device 200 in accordance with the second embodiment.

In the first and second embodiments, the photosensitive organic film 18A is composed of acrylic or novolak resin. The photosensitive organic film 18A may be composed of other photosensitive resin.

In the first embodiment, the light-reflective film 19 is comprised of an aluminum film. As an alternative, the light-reflective film 19 may be comprised of a film composed of an aluminum alloy including aluminum and neodymium or aluminum and silicon, for instance. In the second embodiment, the light-reflective film 19 is comprised of a silver film. As an alternative, the light-reflective film 19 may be comprised of a silver alloy film.

As a barrier metal film, there may be used a titanium film or a chromium film in place of a molybdenum film, for instance.

The liquid crystal display device 200 in accordance with the second embodiment provides the same advantages as those provided by the liquid crystal display device 100 in accordance with the first embodiment.

Furthermore, since the light-reflective film 19 and the source electrode 15 are electrically directly connected to each other through the through-hole 21, it is no longer necessary to form the transparent electrode 17 which was a part of the active matrix substrate 110 in the first embodiment.

In the above-mentioned first and second embodiments, the first wavy pattern 1 is designed to be gently wavy. The first wavy pattern 1 is not to be limited to the pattern shown in the first and second embodiments. For instance, if at least one of the raised and recessed portions has an arcuate or wavy cross-section, a wavy pattern including such raised and/or recessed portions provides the same function as that of the first wavy pattern 1 shown in the first and second embodiments.

Third Embodiment

The liquid crystal display device 100 or 200 in accordance with the first or second embodiment may be applied to various electronic devices. As an example, the liquid crystal display device 100 is applied to a mobile phone in the third embodiment explained hereinbelow.

Figure 17:
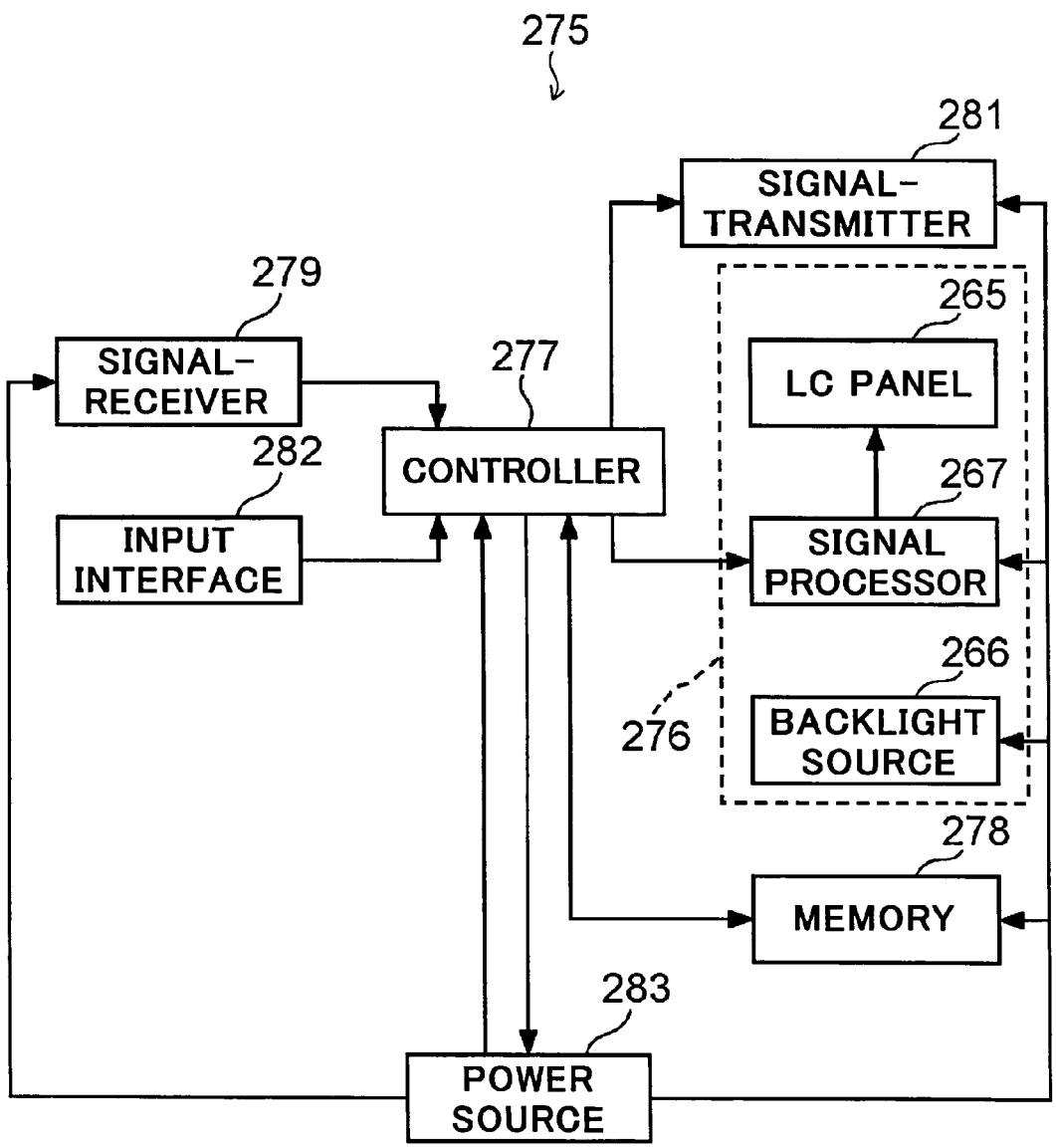
FIG. 17 is a block diagram of a mobile phone including the liquid crystal display device in accordance with the present invention.

FIG. 17 is a block diagram of a mobile phone 275 including the liquid crystal display device 100.

The mobile phone 275 is comprised of a display unit 276, a controller 277 controlling an operation of the parts constituting the mobile phone 275, a memory 278 storing a program to be executed by the controller 277, and various data, a signal-receiver 279 through which radio signals are received, a signal-transmitter 281 through which radio signals are transmitted from the mobile phone 275, an input interface 282 comprised of a keyboard or a pointer, and a power source 283 providing power to the parts constituting the mobile phone 275.

The display unit 276 is comprised of a liquid crystal panel 265, a backlight source 266, and a signal processor 267 processing image signals.

The liquid crystal panel 265 is comprised of the liquid crystal display device 100 in accordance with the first embodiment. By using the liquid crystal display device 100, it is possible to avoid the reflector from being colored, enhancing visibility of the liquid crystal panel 265.

The liquid crystal panel 265 including the liquid crystal display device 100 may be applied to a monitor in a portable personal computer, a note-type personal computer or a desktop type personal computer. In addition, the liquid crystal panel 265 including the liquid crystal display device 100 may be applied to a display unit in various electronic devices such as a mobile communication device, as well as a mobile phone.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2005-035952 filed on Feb. 14, 2005 including specification, claims, drawings and summary is incorporated herein by reference in its entirety.

What is claimed is:

1. A reflector to be used in a liquid crystal display device including: a first substrate; a second substrate disposed in facing relation to said first substrate; and a liquid crystal layer sandwiched between said first and second substrates, wherein an external light is reflected at a reflector formed on one of said first and second substrates to display images therewith,
    said reflector comprising:
    an organic film; and
    a reflective film formed covering said organic film therewith,
    wherein said organic film has first raised and recessed portions at a surface thereof, and second raised and recessed portions formed at a surface of said first raised and recessed portions,
    said first raised and recessed portions including raised portions and recessed portions at least one of which is arcuate in cross-section,
    said second raised and recessed portions being smaller in size than said first raised and recessed portions,
    said reflective film being shaped substantially identical to said first and second raised and recessed portions,
    wherein said second raised and recessed portions are non-uniform in shape and size.

2. The reflector as set forth in claim 1, wherein said first raised and recessed portions are wavy in shape.

3. The reflector as set forth in claim 1, wherein said organic film and said reflective film are disposed overlapping a thin film transistor of said liquid crystal display device.

4. The reflector as set forth in claim 1, wherein a pitch between adjacent raised or recessed portions in said second raised and recessed portions is equal to or smaller than 0.4 micrometers.

5. The reflector as set forth in claim 1, wherein said second raised and recessed portions are formed only at a part of a surface of said organic film.

6. The reflector as set forth in claim 1, wherein said reflective film is composed of aluminum or aluminum alloy.

7. The reflector as set forth in claim 1, wherein said reflective film has a multi-layered structure of an aluminum or aluminum alloy layer and at least one layer composed of a metal other than aluminum.

8. The reflector as set forth in claim 1, wherein said reflective film has a thickness equal to or smaller than 0.4 micrometers.

9. The reflector as set forth in claim 1, wherein said organic film is comprised of a photo-sensitive organic film.

10. The reflector as set forth in claim 1, wherein the second raised and recessed portions are shaped such that at least one of the pitch and depth of adjacent raised portions and/or adjacent recessed portions is non-uniform.

11. The reflector as set forth in claim 1, wherein the second raised and recessed portions are steeper than the first raised and recessed portions.

12. The reflector as set forth in claim 1, wherein the second raised and recessed portions have a different pitch and inclination angle than the first raised and recessed portions.

13. The reflector as set forth in claim 1, wherein the second raised and recessed portions are formed on top of at least one of the raised portions of said first raised and recessed portions.

14. A liquid crystal display device including:
    a first substrate;
    a second substrate disposed in facing relation to said first substrate; and
    a liquid crystal layer sandwiched between said first and second substrates,
    wherein an external light is reflected at a reflector formed on one of said first and second substrates to display images therewith,
    said reflector comprising:
    an organic film; and
    a reflective film formed covering said organic film therewith,
    wherein said organic film has first raised and recessed portions formed at a surface thereof, and second raised and recessed portions formed at a surface of said first raised and recessed portions,
    said first raised and recessed portions including raised portions and recessed portions at least one of which is arcuate in cross-section,
    said second raised and recessed portions being smaller in size than said first raised and recessed portions,
    said reflective film being shaped substantially identical to said first and second raised and recessed portions,
    wherein said second raised and recessed portions are non-uniform in shape and size.

15. An electronic device including a liquid crystal display device as a display unit,
    said liquid crystal display device including:
    a first substrate;
    a second substrate disposed in facing relation to said first substrate; and
    a liquid crystal layer sandwiched between said first and second substrates,
    wherein an external light is reflected at a reflector formed on one of said first and second substrates to display images therewith,
    said reflector comprising:
    an organic film; and
    a reflective film formed covering said organic film therewith,
    wherein said organic film has first raised and recessed portions formed at a surface thereof, and second raised and recessed portions formed at a surface of said first raised and recessed portions, said first raised and recessed portions including raised portions and recessed portions at least one of which is arcuate in cross-section, said second raised and recessed portions being smaller in size than said first raised and recessed portions, said reflective film being shaped substantially identical to said first and second raised and recessed portions, wherein said second raised and recessed portions are non-uniform in shape and size.

16. A method of fabricating a reflector be used in a liquid crystal display device including: a first substrate; a second substrate disposed in facing relation to said first substrate; and a liquid crystal layer sandwiched between said first and second substrates, wherein an external light is reflected at a reflector formed on one of said first and second substrates to display images therewith, said method comprising:

forming a photosensitive organic film on a substrate;

patterning said photosensitive organic film;

thermally annealing said photosensitive organic film to form first raised and recessed portions at a surface thereof, said first raised and recessed portions including raised portions and recessed portions at least one of which is arcuate in cross-section;

forming second raised and recessed portions at a surface of said first raised and recessed portions, said second raised and recessed portions being smaller in size than said first raised and recessed portions; and forming a reflective film on said photosensitive organic film, wherein said reflective film is shaped substantially identical to said first and second raised and recessed portions, wherein said second raised and recessed portions are non-uniform in shape and size.

17. The method as set forth in claim 16, wherein said second raised and recessed portions are formed by dry etching.

18. The method as set forth in claim 17, wherein said dry etching is comprised of ion bombardment.

19. The method as set forth in claim 17, wherein inert gas is used in said dry etching.

20. The method as set forth in claim 17, wherein one of mixture gas including inert gas and oxygen gas, and mixture gas including inert gas and gas containing oxygen atoms is used in said dry etching.

* * * * *